United States Patent [19]
Wiseley

[11] 4,141,050
[45] Feb. 20, 1979

[54] MAGNETIC RECORDING HEAD ASSEMBLY SUPPORT WITH A SINUOUS GIMBAL SPRING

[75] Inventor: Thomas D. Wiseley, Acton, Mass.

[73] Assignee: Data General Corporation, Westboro, Mass.

[21] Appl. No.: 817,908

[22] Filed: Jul. 22, 1977

[51] Int. Cl.² .......................... G11B 21/20; G11B 5/60
[52] U.S. Cl. ....................................... 360/104; 360/103
[58] Field of Search ................................. 360/103, 104

[56] References Cited

U.S. PATENT DOCUMENTS

| 3,177,495 | 4/1965 | Felts | 360/103 |
| 3,618,056 | 11/1971 | Murlimann et al. | 360/103 |
| 4,028,734 | 6/1977 | Mos | 360/104 |

*Primary Examiner*—Robert S. Tupper
*Attorney, Agent, or Firm*—Donald Brown

[57] ABSTRACT

Magnetic recording head assembly for multiple tracks, the assembly including a spring gimbal supporting a plurality of sliders, each slider including at least one recording head, said spring permitting substantial motion of each of the sliders in the z direction as well as pitch and roll motion and restraining motion of said sliders in the x, y directions, as well as yaw motion.

17 Claims, 9 Drawing Figures

MAGNETIC RECORDING HEAD ASSEMBLY SUPPORT WITH A SINUOUS GIMBAL SPRING

BACKGROUND OF THE DISCLOSURE

This disclosure is directed to magnetic recording disk system having a head-per-track subsystem or assembly. The older prior art in this field has comprised what is known in the art as a slider supporting between 9 to 18 recording heads. The slider is then mounted to position the heads for reading and writing on the tracks of the disk.

The primary disadvantage of the older prior art is the size of the slider required to hold each of the individual heads. As the recording density increases, the slider must fly over the disk at increasingly lower altitudes. Since it is not economically feasable to hold relatively large surfaces extremely flat, the older prior art method becomes impractical for recording densities beyond a certain point.

A more recent prior art approach has resulted in a rather massive assembly or block with individual subassemblies mounted on it. This more recent structure has been found to cause capacitance related problems at the current high frequency recording rates as well as alignment difficulties.

In view of the foregoing, there has developed a need for a simpler more compact structure which could easily and economically maintain the heads flat with respect to the disk as well as reduce capacitance problems, thus allowing the use of higher recording frequencies.

The present invention in the most preferred form provides the above advantages by the use of a serpentine gimbal spring which holds a plurality of multihead sliders in a prescribed relationship. The sliders are held firmly in a common plane for purpose of interlace control and are free to move perpendicular to the plane and gimbal about axes in the plane to provide correct flying in operation.

BRIEF DESCRIPTION OF THE DISCLOSURE

This invention relates to a multiple track recording head assembly incorporating a plurality of sliders each having at least one recording head. The sliders are each supported by a common floating serpentine spring element and the heads are prealigned with respect to each other so that when the head assembly is positioned with respect to a magnetic disk, the heads are properly aligned to the disk in order to read or write data on the tracks of the disk.

The spring of this invention permits substantial motion of each of the sliders i.e., with respect to the disk surface in the z direction as well as pitch and roll motion and restrains motion of said sliders in the x, y directions as well as yaw motion i.e., motion in the x,y plane).

DETAILED DESCRIPTION OF THE DRAWINGS

Figure 1:
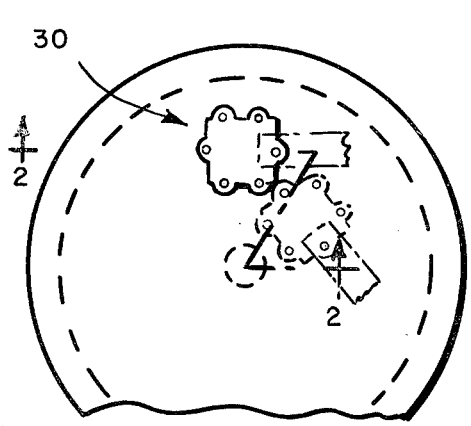
FIG. 1 is a partial top view of the multiple track recording head assembly of the disclosure mounted above a magnetic disk.
Figure 2:
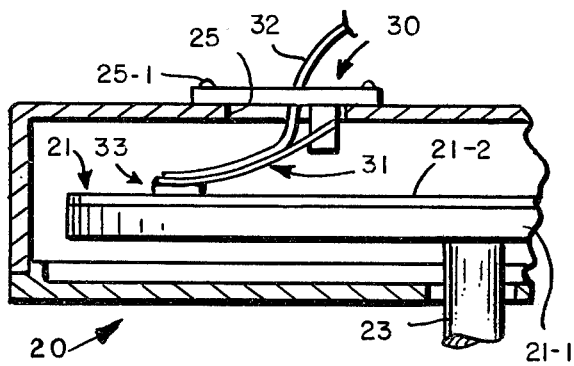
FIG. 2 is a sectional view taken along line 2—2 in FIG. 1.

Reference should now be had to the FIGS. 1 to 9 for a description of the preferred embodiment of the disclosure. In FIGS. 1 and 2 there is shown a typical magnetic disk storage system 20 comprising a disk 21 having a central portion 21-1 with a top magnetic oxide coating 21-2. The disk is preferably of the Winchester style having a film lubricant on the surface thereof such as sold by BASF or Minnesota Mining and Manufacturing Co. (3M).

The disk 21 may also conventionally have a bottom magnetic coating so that additional head assemblies as disclosed herein, mounted to fly over the bottom coating, may read and write data on tracks of the bottom magnetic coating.

The disk 21 is conventionally supported by a shaft 23 driven in a manner well known in the art. At 30 there is shown the multitrack head assembly of this invention supported by the disk housing 25 by bolts as shown with a portion thereof extending into a hole 25-1. It should be understood that additional multitrack head assemblies 30 (shown dotted) in FIG. 1 may also be used if additional recording tracks are desired.

The assembly 30 comprises a top support member 30-1 having a projection 30-2 extending downwardly therefrom. A loading spring device 31 e.g., of berylium copper alloy having a plurality of load spring leafs 31-1 extending therefrom is supported by an inclined member 30-3 and bolts 30-4 as shown (see FIGS. 3 and 9).

Figure 4:
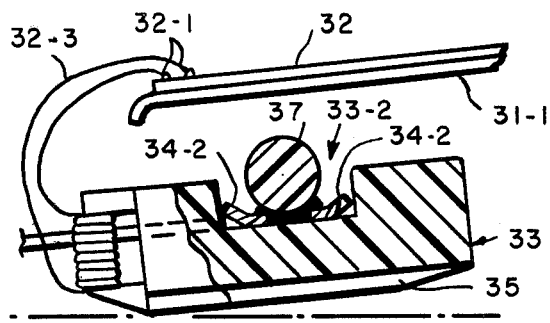
FIG. 4 is a sectional view taken along line 4—4 in FIG. 3.
Figure 5:
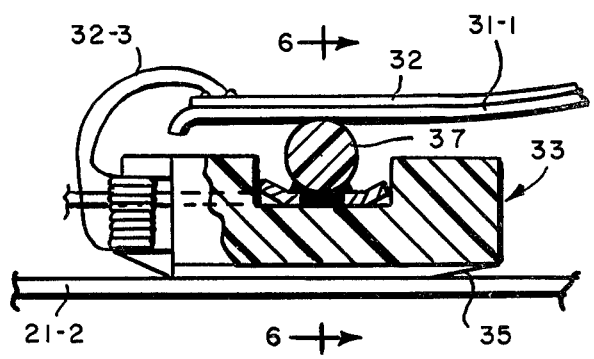
FIG. 5 is a view similar to FIG. 4 showing the recording head assembly positioned on the disk.
Figure 7:
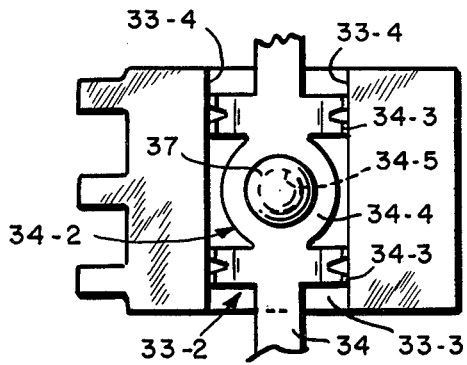
FIG. 7 is a top view of a slider mounted to the spring of the disclosure.

The load spring leafs 31-1 support on the top thereof a flexible circuit 32 e.g., Kapton having wires encapsulated therein for making connection to terminals 32-1 (see FIG. 4) which in turn are connected by connecting wires 32-3 to the individual heads 35 (FIGS. 4 and 5). The heads 35 are supported by a slider 33 and a gimbal spring 34, all of which will now be more fully described.

At 33 there is shown a separate slider commonly termed a Winchester slider positioned below an associated load spring leaf 31-1. Each of the sliders 33 as shown herein is for three track operation in the preferred embodiment, i.e., having three read/write or recording heads 35, and may be purchased from National Micronetics Inc. or Matsushita Corporation.

The recording heads 35 supported by the slider 33 as shown are coupled through wires 32-3 to wires of the flexible cable 32. The cable wires are in turn, as well known in the art, coupled to matrix selection diodes which in turn are coupled to a storage and control system.

Since these latter components (not shown) form no part of the invention, there will be no further discussion thereof.

The sliders each comprise an insulator having three posts 33-1 with the recording heads 35 on the top thereof as is conventional. The sliders 33 are each provided with a channel 33-2 having a bottom 33-3 and sides 33-4.

Figure 3:
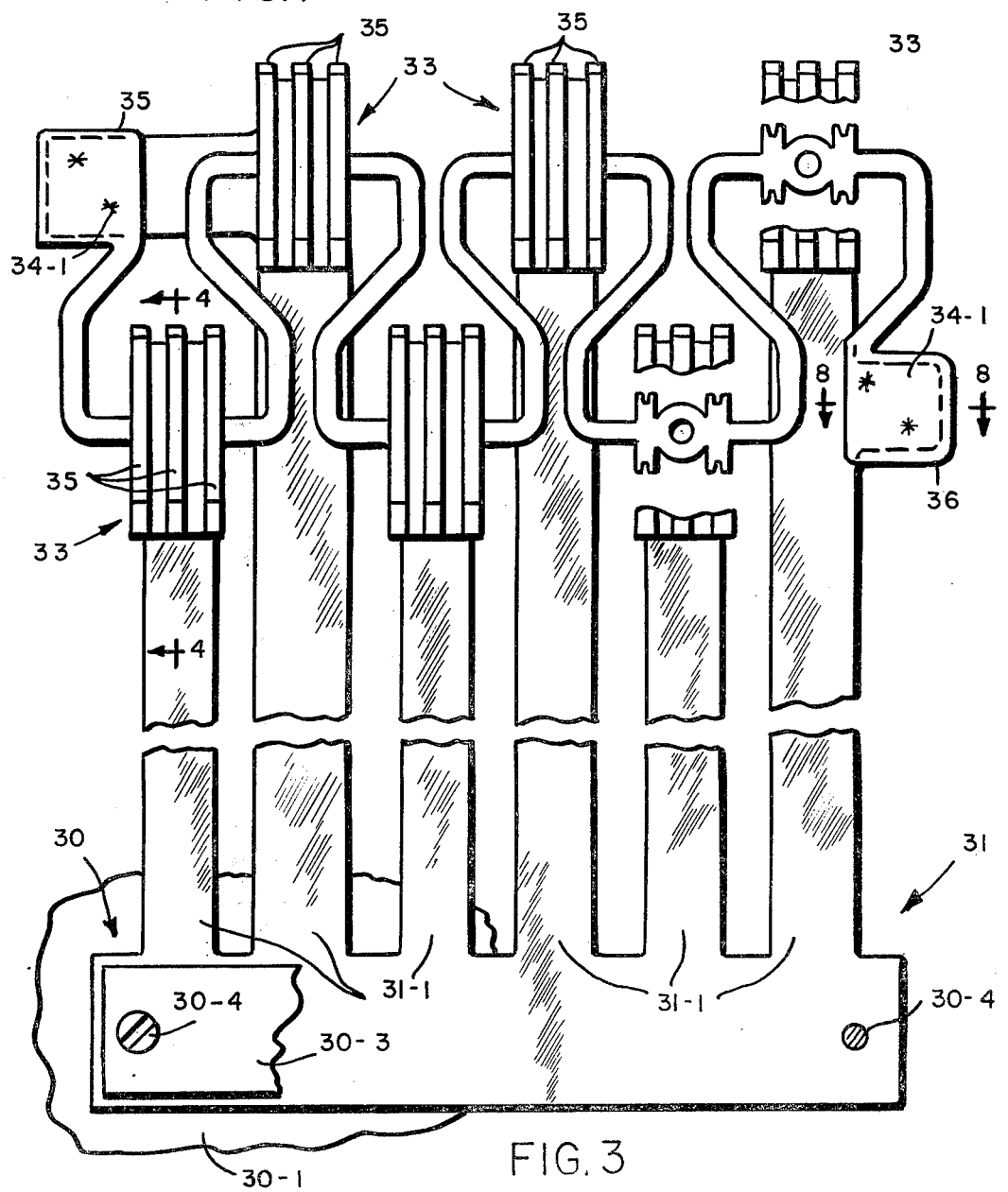
FIG. 3 is an enlarged bottom view of the recording head assembly of the disclosure.
Figure 8:
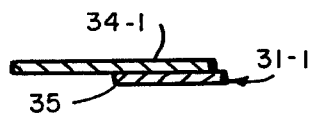
FIG. 8 is a sectional view taken along line 8—8 in FIG. 3.
Figure 9:
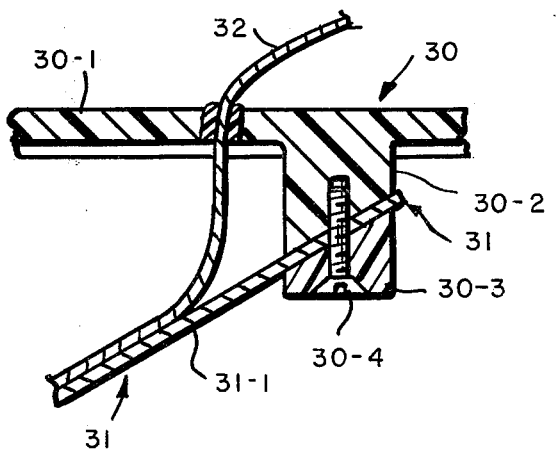
FIG. 9 is a sectional view taken along line 9—9 in FIG. 1.

At 34 there is shown a serpentine gimbal spring e.g., of 303 stainless steel, 2 mils thick, which is provided with ears 34-1 at both ends for coupling to pads 35 and 36 e.g., by glue or a spot weld, forming a part of two of the leaf springs 31-1 as shown in FIGS. 3 and 8.

The spring 34 is provided with slider mounting portions 34-2 having bent spring leafs 34-3. The mounting portions are positioned in the channel 33-2 and rests against the bottom 33-3 thereof with the leafs 34-3 wedged against the channel sides 33-4 in a manner to prevent separation of the slider 33 from the spring 34.

The mounting portion 34 also includes a portion 34-4 having a hole 34-5 over which there is positioned a ball e.g., of nylon and 1/16″ diameter. Glue, e.g., Albestick #257, epoxy, is used to hold the ball in position in the hole 34-5 and preferably to the slider 33 (see FIG. 6).

Figure 6:
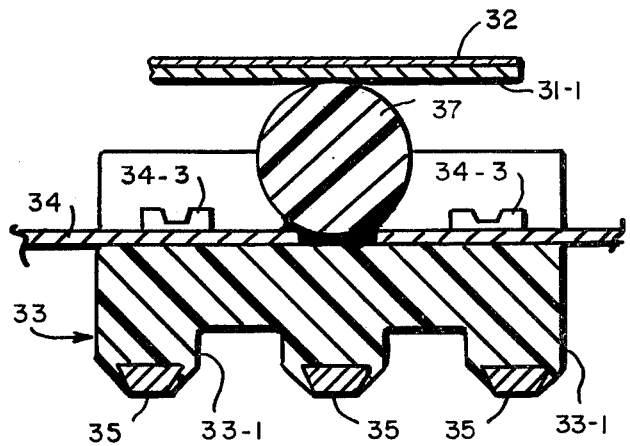
FIG. 6 is a sectional view taken along line 6—6 in FIG. 5.

FIG. 6 shows the slider 33 and head 34 positioned against the disk surface 21-2 and held downwardly by the leaf 31-1 engaging the ball 37.

As may be observed the sliders 33 are all in the same plane and are independently moveable with respect to each other. The spring 34 is preferably shaped as shown in FIG. 3 to form an outline of figure looking down from the top which is wider across the top portion and narrower at the base so that two adjacent parallel rows of sliders with one row in advance of the other and offset from each other may be compactly positioned for recording on adjacent bands or tracks on the disk surface 21-2.

While the foregoing spring 34 shape is the most preferred this invention does not preclude other serpentine shapes such as a saw tooth or a modified saw tooth as long as the spring, restrains x and y plannar motion as well as yaw motion, and permits z (up and down) and roll and pitch motion.

I claim:

1. A multitrack magnetic recording assembly for use with a magnetic recording media comprising a sinuous spring, a plurality of sliders supported by said spring, each slider supporting at lease one recording head, and resilient loading means contacting each slider and urging each toward the recording media, each end of said sinuous spring being coupled to said resilient loading means, said spring restraining the motion of said sliders in the x, y directions and against yaw motion and permitting z motion as well as pitch and roll motion of said slider.

2. The assembly of claim 1 in which each of said slider supports a plurality of heads in a parallel relationship to one another.

3. The assembly according to claim 1 in which said sliders each include a channel in which said spring is positioned.

4. The assembly according to claim 3 in which said sliders lay in the same plane, and in which said sliders form two substantially parallel rows, one row being forward and offset of the other row.

5. The assembly of claim 1 in which said spring is shaped such that each spring section supporting a slider outlines a shape which is narrower at the base than at the top, the base of each spring section includes means for coupling the slider thereto.

6. The assembly of claim 5 in which each slider includes a channel, and in which the spring has leaf portions wedged against the side walls of the channel in said slider.

7. A multitrack magnetic recording head assembly for use with a magnetic recording media comprising a base, a plurality of load springs extending from said base, a sinuous gimbal spring, each end of said sinuous gimbal spring being coupled to a load spring, a plurality of sliders coupled to said sinuous gimbal spring, one load spring contacting each slider for urging each toward the recording media, each slider supporting at least one recording head.

8. The assembly of claim 7 in which the sliders are positioned in two rows, one row in advance of the other and each row offset in displacement from each other.

9. The assembly of claim 7 in which all sliders are positioned in the same plane.

10. The assembly of claim 8 in which all sliders are positioned in the same plane.

11. The assembly of claim 7 in which the gimbal spring includes coupling portions having leafs, in which said slider includes a channel, and in which said leafs are wedged against the sides of the channel.

12. The assembly according to claim 11 in which each said coupling portion includes a hole and in which a ball is mounted in said hole and engages said ball when transducing said load spring.

13. A multitrack magnetic recording assembly for use with a magnetic recording media, comprising a support, a plurality of load springs extending from said support, a sinuous gimbal spring, each end of said sinuous spring being coupled to a load spring, a plurality of sliders supported by said gimbal spring and associated with a different one of said load springs, each slider supporting at least one recording head, said spring restraining the motion of said sliders in the x, y directions and against yaw motion and freely permitting z motion as well as pitch and roll motion of said slider, said gimbal spring having coupling portions for coupling each of said sliders to its, and a ball supported by each of said coupling portions and in contact with its associated load spring when transducing to urge the slider toward the recording media.

14. The assembly of claim 13 in which each head is coupled by wires to terminals supported by the load spring closest to it.

15. The assembly according to claim 14 in which said sliders lay in the same plane, and in which said sliders form two substantially parallel rows, one row being forward of the other row and offset in displacement from one another.

16. The assembly of claim 15 in which said spring is shaped such that each spring portion supporting a slider outlines a shape which is narrower at the base than at the top.

17. The assembly of claim 16 in which each slider includes a channel, and in which the gimbal spring coupling portions engage the side walls of the channel.

* * * * *